(12) United States Patent
Park

(10) Patent No.: US 12,596,078 B2
(45) Date of Patent: Apr. 7, 2026

(54) APPARATUS FOR ANALYZING METAL CONTAMINATION OF A WAFER AND A METHOD THEREOF

(71) Applicant: SK SILTRON CO., LTD., Gumi-si (KR)

(72) Inventor: Woo Young Park, Gumi-si (KR)

(73) Assignee: SK SILTRON CO., LTD., Gumi-si (KR)

( * ) Notice: Subject to any disclaimer, the term of this patent is extended or adjusted under 35 U.S.C. 154(b) by 379 days.

(21) Appl. No.: 18/525,048

(22) Filed: Nov. 30, 2023

(65) Prior Publication Data

US 2024/0282566 A1 Aug. 22, 2024

(30) Foreign Application Priority Data

Feb. 16, 2023 (KR) ........................ 10-2023-0020518

(51) Int. Cl.
*G01N 21/94* (2006.01)
(52) U.S. Cl.
CPC .................................. *G01N 21/94* (2013.01)
(58) Field of Classification Search
USPC ................................................ 250/281, 282
See application file for complete search history.

(56) References Cited

U.S. PATENT DOCUMENTS

| | | | |
|---|---|---|---|
| 6,725,119 B1 * | 4/2004 | Wake | H01L 21/02063 |
| | | | 257/E21.228 |
| 2006/0160239 A1 * | 7/2006 | Lee | G01N 21/314 |
| | | | 134/2 |

FOREIGN PATENT DOCUMENTS

| | | |
|---|---|---|
| KR | 10-0372526 B1 | 2/2003 |
| KR | 10-2022-0039641 A | 3/2022 |

OTHER PUBLICATIONS

Korean Office Action for KR Application No. 10-2023-0020518 dated Mar. 21, 2025, 5 pages.

* cited by examiner

*Primary Examiner* — Kiet T Nguyen
(74) *Attorney, Agent, or Firm* — Lewis Roca Rothgerber Christie LLP

(57) ABSTRACT

A method for analyzing metal contamination of a wafer comprises obtaining a contamination level of a first metal and a contamination level of a second metal for the wafer, obtaining a correction value by substituting the obtained contamination level of the second metal into a correlation equation, and obtaining a final contamination level of the first metal, by correcting the contamination level of the obtained first metal based on the correction value.

16 Claims, 6 Drawing Sheets

APPARATUS FOR ANALYZING METAL CONTAMINATION OF A WAFER AND A METHOD THEREOF

CROSS-REFERENCE TO RELATED APPLICATIONS

This application claims priority to Korean Patent Application Number 10-2023-0020518, filed on Feb. 16, 2023, the entire content of which is incorporated herein by reference.

BACKGROUND OF THE INVENTION

1. Field of the Invention

The embodiment relates to a device and for analyzing metal contamination of a wafer and a method thereof.

2. Discussion of the Related Art

Contamination from various metals or organic substances occurs on a wafer during the manufacturing process. Even in extremely small amounts, the contamination significantly deteriorates semiconductor properties and must be removed.

Before removing these contaminants, the contamination level of each of the corresponding metals contained on the wafer must first be analyzed.

An inductively-coupled plasma-mass spectrometry (hereinafter referred to as ICP-MS) is used for contamination analysis. The various metals on the wafer are separated by mass by the mass separator of ICP-MS, and then the corresponding metals are detected by a detector. The metals detected in this way are analyzed, and the level of contamination for each of the various metals is determined.

However, there is a problem that interference phenomenon occurs between elements of similar mass, that is, metals, and the contamination level of the detected metal is distorted. Accordingly, since the quality of wafers is managed based on the distorted metal contamination level, that is, the inaccurate metal contamination level, there is a problem that reliability is greatly reduced.

SUMMARY OF THE INVENTION

An object of the embodiment is to solve the foregoing and other problems.

Another object of the embodiment is to provide a device and for analyzing metal contamination of a wafer and a method thereof that can accurately obtain the metal contamination level.

Another object of the embodiment is to provide a device and for analyzing metal contamination of a wafer and a method thereof that can improve product reliability.

The technical problem of the embodiment is not limited to those described in this section, and comprise those that can be grasped through the description of the invention.

According to the first aspect of the embodiment to achieve the above or other objects, a method for analyzing metal contamination of a wafer, comprising: obtaining a contamination level of a first metal and a contamination level of a second metal for the wafer; obtaining a correction value by substituting the obtained contamination level of the second metal into a correlation equation; and obtaining a final contamination level of the first metal, by correcting the contamination level of the obtained first metal based on the correction value.

The correlation equation can be expressed in Equation 1 below.

$$y = 0.0143x + 0.0055 \qquad \text{[Equation 1]}$$

x represents the obtained contamination level of the second metal, and y represents the correction value.

Before obtaining the contamination level of the first metal and the contamination level of the second metal, respectively, the method can comprise obtaining the correlation equation.

The obtaining of the correlation equation can comprise obtaining the correlation equation based on an interference relationship between the contamination level of the first metal and the contamination level of the second metal in each of the plurality of samples, by verifying a plurality of samples prepared using a mixed solution containing the first metal and the second metal.

The second metal can have an isotope similar to the isotope of the first metal.

The first metal can be $^{58}$Ni, and the second metal can be $^{56}$Fe.

The correction value can be an interference value given by the second metal to the first metal.

The obtaining of the final contamination level of the first metal can comprise subtracting the correction value from the obtained contamination level of the first metal.

According to a second aspect of the embodiment, an apparatus for analyzing metal contamination of a wafer, comprising: a controller, wherein the controller is configured to: obtain a contamination level of a first metal and a contamination level of a second metal for the wafer; obtain a correction value by substituting the obtained contamination level of the second metal into a correlation equation; and obtain a final contamination level of the first metal, by correcting the contamination level of the obtained first metal based on the correction value.

The correlation equation can be expressed in Equation 1 below.

$$y = 0.0143x + 0.0055 \qquad \text{[Equation 1]}$$

x represents the obtained contamination level of the second metal, and y represents the correction value.

The controller can obtain the correlation equation based on an interference relationship between the contamination level of the first metal and the contamination level of the second metal in each of the plurality of samples, by verifying a plurality of samples prepared using a mixed solution containing the first metal and the second metal.

The second metal can have an isotope similar to the isotope of the first metal.

The first metal can be $^{58}$Ni, and the second metal can be $^{56}$Fe.

The correction value can be an interference value given by the second metal to the first metal.

The controller can subtract the correction value from the obtained contamination level of the first metal.

The wafer can comprise one of a silicon wafer, a silicon carbide wafer, an SOI wafer, a sapphire wafer, and a compound semiconductor wafer.

The effect of a device and for analyzing metal contamination of a wafer and a method thereof according to the embodiment is described as follows.

Even if the contamination level of the first metal, such as Ni 58, obtained from the wafer is inaccurately obtained by the second metal, such as Fe 56, a correction value can be obtained using a correlation equation that takes into account the degree of distortion between Ni 58 and Fe 56. By using the obtained correction value, the contamination correction of Ni 58 can be corrected to obtain an accurate contamination level. Accordingly, the level of contamination of the metal to be analyzed becomes dramatically more accurate, and reliability can be significantly improved.

A further scope of applicability of the embodiment will become apparent from the detailed description that follows. However, since various changes and modifications within the spirit and scope of the embodiment can be clearly understood by those skilled in the art, it should be understood that the detailed description and specific embodiment, such as preferred embodiment, are given by way of example only.

DETAILED DESCRIPTION OF THE PREFERRED EMBODIMENTS

Figure 1:
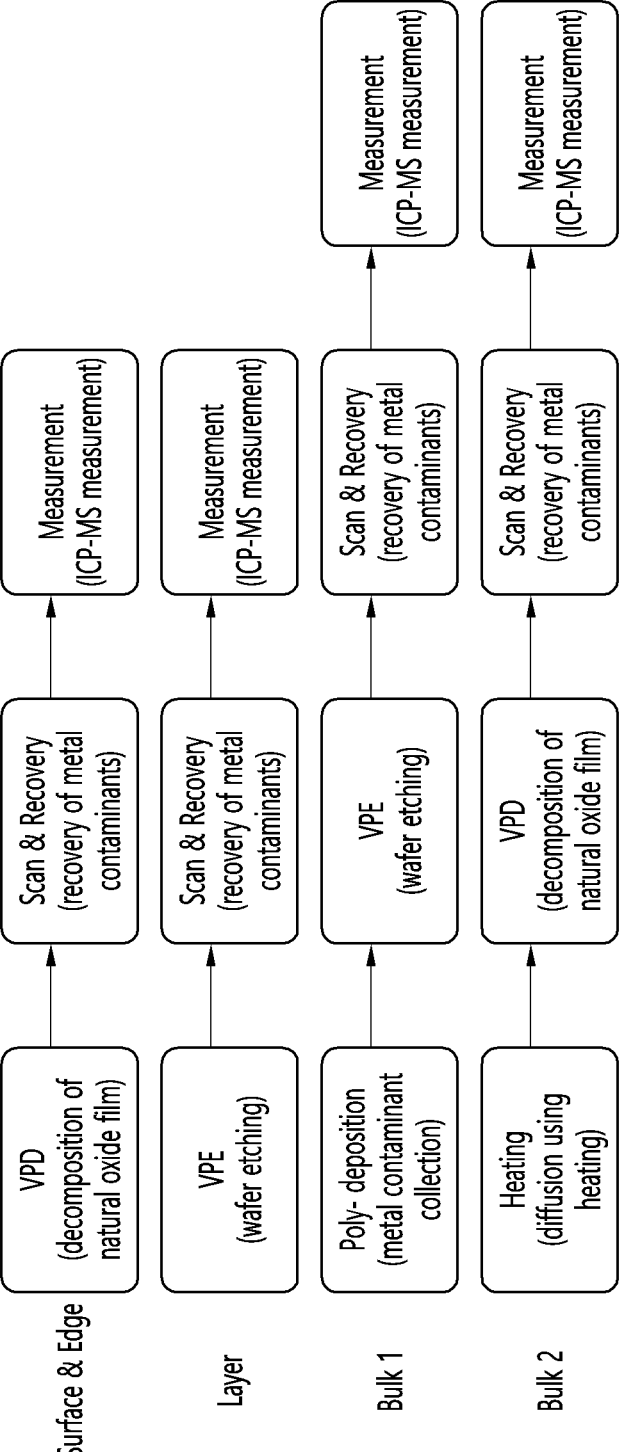
FIG. 1 is a diagram illustrating an analysis method for each position of a wafer.

Hereinafter, the embodiment disclosed in this specification will be described in detail with reference to the accompanying drawings, but the same or similar elements are given the same reference numerals regardless of reference numerals, and redundant descriptions thereof will be omitted. The suffixes 'module' and 'unit' for the elements used in the following descriptions are given or used interchangeably in consideration of ease of writing the specification, and do not themselves have a meaning or role that is distinct from each other. In addition, the accompanying drawings are for easy understanding of the embodiment disclosed in this specification, and the technical idea disclosed in this specification is not limited by the accompanying drawings. Also, when an element such as a layer, region or substrate is referred to as being 'on' another element, this means that there can be directly on the other element or be other intermediate elements therebetween.

The wafer described below can comprise one of a silicon wafer, a silicon carbide wafer, a silicon on insulator (SOI) wafer, a sapphire wafer, and a compound semiconductor wafer, but, but is not limited thereto. The compound semiconductor wafer can be a GaN wafer, but is not limited thereto.

A metal contamination analysis can be performed on various regions wafer. Accordingly, the analysis method can vary depending on which regions within the wafer is analyzed.

For example, analysis of the wafer surface can be called surface metal analysis, analysis of the region within about 1 μm from the wafer surface can be called layer metal analysis, analysis of the edge region of the wafer can be called edge metal analysis, and analysis of the bulk region of the wafer can be called bulk metal analysis. These various analysis methods are shown in FIG. 1.

FIG. 1 is a diagram illustrating an analysis method for each position of a wafer.

As shown in FIG. 1, a surface metal analysis and an edge metal analysis can be performed through natural oxide film decomposition using a vapor phase decomposition (VPD), recovery of metal contaminants using scan and recovery, and measurement using ICP-MS.

A layer metal analysis can be done through wafer etching using a vapor phase etching (VPE), recovery of metal contaminants using scan and recovery, and measurement using ICP-MS.

As an example, a bulk metal analysis Bulk 1 can be accomplished through metal contaminant collection using poly deposition, wafer etching using a vapor phase etching (VPE), recovery of metal contaminants using scan and recovery, and measurement using ICP-MS.

As another example, a bulk metal analysis Bulk 2 can be accomplished through diffusion using heating, decomposition of natural oxide film using a vapor phase etching (VPE), recovery of metal contaminants using scan and recovery, and measurement using ICP-MS.

Although the preprocessing methods in these various analysis methods are different, the final measurement method can be performed using ICP-MS.

As previously described, various metals on the wafer can be separated by mass by the mass separator of ICP-MS, and then the corresponding metals can be detected by a detector. At this time, among various metals, metals with similar mass values (or isotopes) can interfere with each other.

In the following examples, the metal to be analyzed can be Ni, and the metal that has an interference effect on Ni can be Fe. As will be explained later, $^{56}$Fe can interfere with $^{58}$Ni, but can have little interference with $^{60}$Ni. In the following description, $^{56}$Fe and Fe 56 can be used interchangeably, $^{58}$Ni and Ni 58 can be used interchangeably, and $^{60}$Ni and Ni 60 can be used interchangeably. In the description below, the first metal can be $^{58}$Ni and the second metal can be $^{56}$Fe. That is, the first metal is a target metal for analyzing the contamination level, and the second metal can be a metal that interferes with the first metal when detecting the first metal and distorts the contamination level of the first metal.

According to an embodiment, when various metals are separated by mass (or isotope) by the mass separator of ICP-MS, even if the target metal to be detected, that is, the first metal, is distorted due to interference by the second metal, the accurate contamination level of the first metal can be obtained. Accordingly, reliability can be improved.

Hereinafter, a method for analyzing metal contamination of a wafer according to an embodiment will be described in detail with reference to FIGS. 2 to 6.

An apparatus for analyzing metal contamination of a wafer according to an embodiment is hardware for performing the methods shown in FIGS. 2 to 6 and can comprise a memory and a processor (or controller). Various data or information obtained by performing the following embodiments can be stored in the memory. Additionally, programs, tools, Excel sheets, calculation programs, calculation logic, data programs, etc. for performing the methods shown in FIGS. 2 to 6 can be stored in the memory. The processor can execute program, etc., stored in memory and can perform classification or calculations based on various data or information.

Unless specifically mentioned, the series of steps described below can be performed by a processor.

Figure 2:
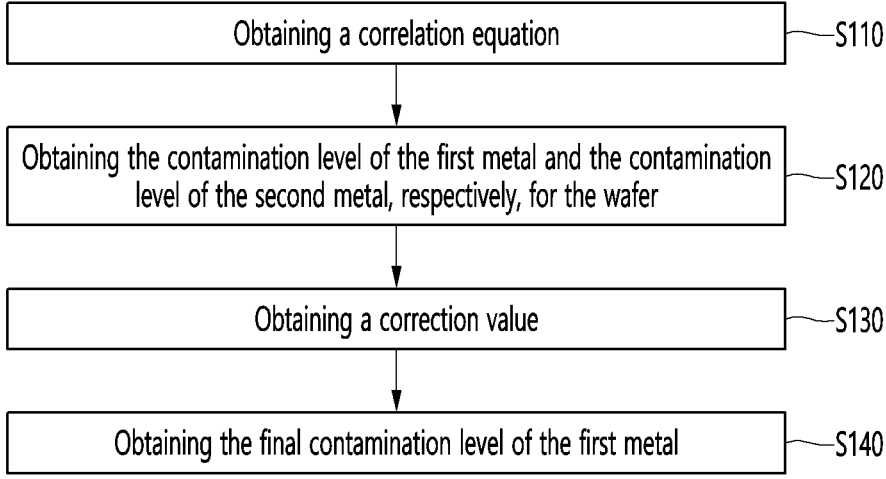
FIG. 2 is a flowchart explaining a method for analyzing metal contamination of a wafer according to an embodiment.

FIG. 2 is a flowchart explaining a method for analyzing metal contamination of a wafer according to an embodiment.

Referring to FIG. 2, the method for analyzing metal contamination of a wafer according to an embodiment can comprise a step (S110) of obtaining a correlation equation, a step (S120) of obtaining the contamination level of the first metal and the contamination level of the second metal, respectively, for the wafer, a step (S130) of obtaining a correction value, and a step (S140) of obtaining the final contamination level of the first metal.

The step (S110) of obtaining a correlation equation can be performed before the step (S120) of obtaining the contamination level of the first metal and the contamination level of the second metal, respectively. The correlation equation obtained in this way can be stored in memory.

A correlation equation can be established between metals that have similar masses (or isotopes) and thus interfere with each other.

For example, when the contamination level of the first metal is obtained through an analysis process, the second metal that has an interference effect on the first metal can be found, and a correlation equation can be calculated based on the correlation between the first metal and the second metal.

With reference to FIGS. 3 to 6, the correlation (or interference relationship) between the first metal and the second metal and the process by which the correlation equation is obtained based on this correlation will be explained.

For example, by verifying a plurality of samples prepared using a single solution containing a second metal, a correlation equation is obtained based on the interference relationship between the contamination level of the first metal and the contamination level of the second metal in each of the plurality of samples.

First, as shown in Table 1, No. 1 to No. 3 can be samples prepared using a single solution containing Ni, and No. 4 to No. 7 can be samples prepared using a single solution containing Fe, and No. 8 to No. 11 can be samples prepared using a mixed solution containing Ni and Fe.

TABLE 1

| Test | Blank solution[ml] | Contamination solution[ml] | Ni contamination level[ppb] | Fe contamination level[ppb] |
|---|---|---|---|---|
| No. 1 | 90 | 10 | 5 | |
| No. 2 | 9 | 1 | 0.5 | |
| No. 3 | 9 | 1 | 0.05 | |
| No. 4 | 90 | 10 | | 30 |
| No. 5 | 90 | 10 | | 3 |
| No. 6 | 9 | 1 | | 0.3 |
| No. 7 | 9 | 1 | | 0.03 |
| No. 8 | 4 | No. 02: 0.5 No. 06: 0.5 | 0.05 | 0.03 |
| No. 9 | 4 | No. 02: 0.5Fe Buffer-2: 0.5 | 0.05 | 30 |
| No. 10 | 4 | Ni Buffer-2: 0.5 No. 06: 0.5 | 5 | 0.03 |

TABLE 1-continued

| Test | Blank solution[ml] | Contamination solution[ml] | Ni contamination level[ppb] | Fe contamination level[ppb] |
|---|---|---|---|---|
| No. 11 | 4 | Ni Buffer-2: 0.5Fe Buffer-2: 0.5 | 5 | 30 |

Figure 3:
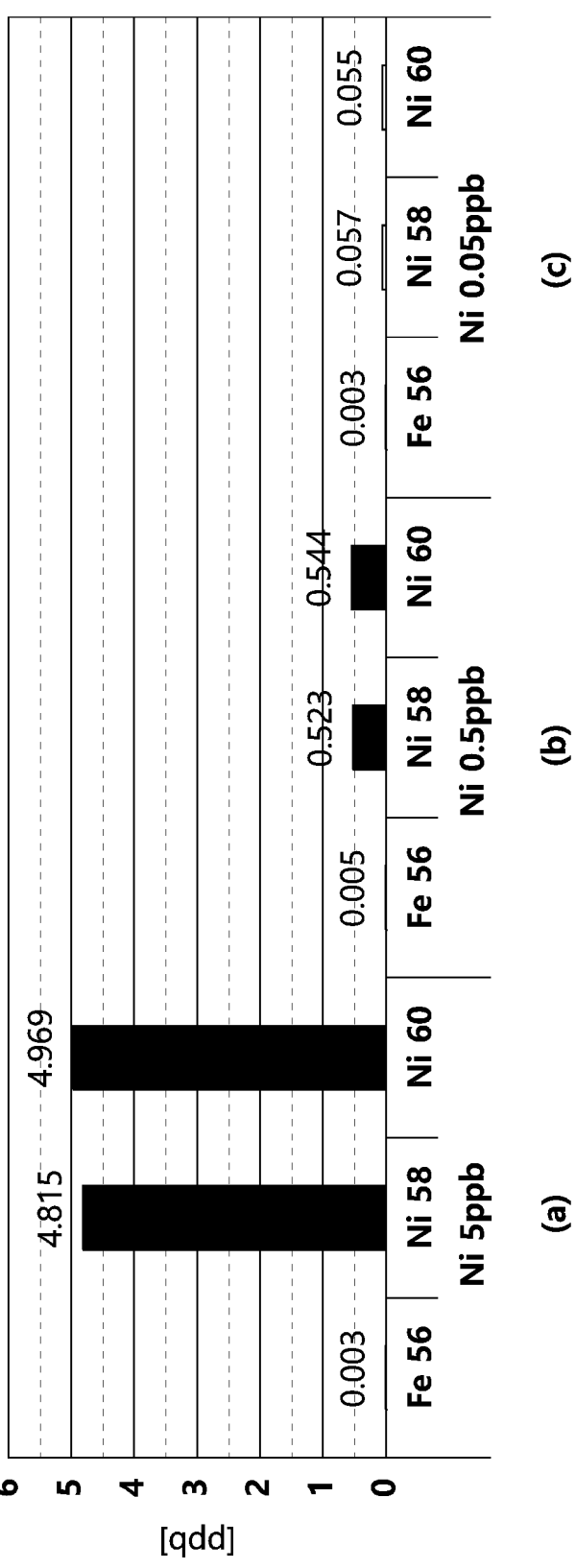
FIG. 3 shows the contamination levels of each of Fe 56, Ni 58 and Ni 60 verified using a single solution containing Ni.

FIG. 3 shows the contamination levels of each of Fe 56, Ni 58 and Ni 60 verified using a single solution containing Ni. As shown in FIG. 3a, when verified using a single solution containing Ni, as a result of the verification, it can be seen that the respective contamination levels of Ni 58 and Ni 60 can be 4.5815 ppb and 4.969 ppb, which is almost identical to the target contamination level (5 ppb).

As shown in FIG. 3b, when verified using a single solution containing Ni, as a result of the verification, it can be seen that the respective contamination levels of Ni 58 and Ni 60 can be 0.523 ppb and 0.544 ppb, which is almost identical to the target contamination level 0.5 ppb.

As shown in FIG. 3c, when verified using a single solution containing Ni, as a result of the verification, it can be seen that the contamination levels of Ni 58 and Ni 60 can be 0.057 ppb and 0.055 ppb, respectively, which is almost identical to the target contamination level 0.05 ppb.

As shown in FIGS. 3a to 3c, when verification is performed using a single solution containing Ni, verification can be performed according to the target contamination level, and from this, it can be seen that there is no problem with IPS-MS.

Meanwhile, as shown in FIGS. 3a to 3c, the verification results can show that the contamination levels of Ni 58 and Ni 60 are very similar. This suggests that, as will be explained below in relation to FIG. 4, the contamination level of Ni 58 should normally be very similar to that of Ni 60 when verified through a single solution with Fe.

Meanwhile, as a result of the verification, it can be seen that although the contamination levels of Ni 58 and Ni 60 are similar, they are different. For example, at a target contamination level of 5 ppb (FIG. 3a), the contamination level of Ni 58 can be 96.9% of the contamination level of Ni 60, and at a target contamination level of 0.5 ppb (FIG. 3b), the contamination level of Ni 58 can be 96.1% of the contamination level of Ni 60, and at a target contamination level of 0.05 ppb (FIG. 3c), the contamination level of Ni 58 can be 103.6% of the contamination level of Ni 60. In this case, averaging these, the contamination level of Ni 58 can be approximately 99.9% of that of Ni 60.

Meanwhile, when verified using a single solution containing Ni, it can be seen that the contamination level of Fe is almost negligible.

Figure 4:
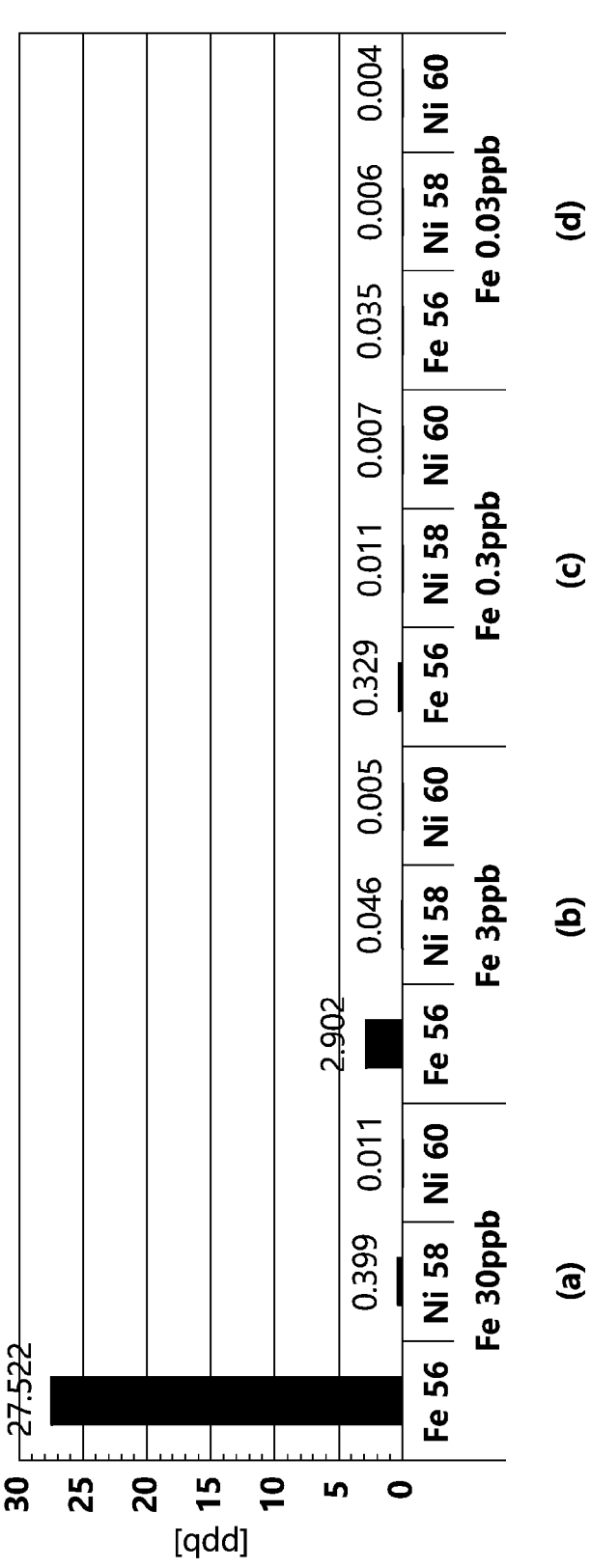
FIG. 4 shows the contamination levels of Fe 56, Ni 58 and Ni 60 verified using a single solution containing Fe.

FIG. 4 shows the contamination levels of Fe 56, Ni 58 and Ni 60 verified using a single solution containing Fe.

As shown in FIG. 4a, when verified using a single solution containing Fe, as a result of the verification, it can be seen that the contamination level of Fe 56 can be 27.522 ppb, which is very similar to the target contamination level 30 ppb.

Meanwhile, normally the contamination levels of Ni 58 and Ni 60 should be barely obtained or should be obtained to a negligible degree, and even if the contamination levels of Ni 58 and Ni 60 are obtained, the contamination level of Ni 58 should closely match that of Ni 60. However, the contamination level of Ni 58 can be 0.399 ppb, which is approximately 36 times higher than that of Ni 60, which is 0.011 ppb. From this, it can be seen that Ni 58 can be greatly affected by interference by Fe 56, and the contamination level of Ni 58 can be distorted, resulting in a very large contamination level.

As shown in FIG. 4b, when verified using a single solution containing Fe, as the verification result, it can be seen that the contamination level of Fe 56 can be 2.902 ppb, which is very similar to the target contamination level 3 ppb.

Meanwhile, normally the contamination levels of Ni 58 and Ni 60 should be barely obtained or should be obtained to a negligible degree, and even if the contamination levels of Ni 58 and Ni 60 are obtained, the contamination level of Ni 58 should closely match that of Ni 60. However, the contamination level of Ni 58 can be 0.046 ppb, which is approximately 9 times higher than that of Ni 60, which is 0.005 ppb. From this, it can be seen that Ni 58 can be greatly affected by interference by Fe 56, and the contamination level of Ni 58 can be distorted, resulting in a very large contamination level.

As shown in FIG. 4c, when verified using a single solution containing Fe, the verification result can show that the contamination level of Fe 56 is 0.329 ppb, which is very similar to the target contamination level (0.3 ppb).

Meanwhile, normally the contamination levels of Ni 58 and Ni 60 should be barely obtained or should be obtained to a negligible degree, and even if the contamination levels of Ni 58 and Ni 60 are obtained, the contamination level of Ni 58 should closely match that of Ni 60. As a result of the verification, the contamination level of Ni 58 can be 0.011 ppb, which is not much different from the contamination level of Ni 60, which is 0.007 ppb. From this, it can be seen that Ni 58 may not greatly be interfered with by Fe 56 as the target contamination level of Fe 56 is lowered.

As shown in FIG. 4d, when verified using a single solution containing Fe, the verification result can show that the contamination level of Fe 56 is 0.035 ppb, which is very similar to the target contamination level 0.03 ppb.

Meanwhile, normally the contamination levels of Ni 58 and Ni 60 should be barely obtained or should be obtained to a negligible degree, and even if the contamination levels of Ni 58 and Ni 60 are obtained, the contamination level of Ni 58 should closely match that of Ni 60. As a result of the verification, the contamination level of Ni 58 can be 0.006 ppb, which is almost similar to the contamination level of Ni 60, which is 0.004 ppb. From this, it can be seen that Ni 58 may not greatly be interfered with by Fe 56 as the target contamination level of Fe 56 becomes further lowered.

As shown in FIGS. 4a to 4d, it can be seen that Ni 58 has a similar contamination level to Ni 60 and is affected by interference by Fe 56. In particular, it can be seen that the greater the contamination level of Fe 56, the more Ni 58 is affected by interference by Fe 56, the distortion of the contamination level of Ni 58 becomes greater, and the contamination level also becomes higher.

In addition, it can be seen that the contamination level of Fe 56 and the contamination sequence of Ni 58 have a linear correlation. In other words, as shown in FIG. 6, it can be seen that $R^2=1$, in which x and y have a perfect linear relationship.

Figure 6:
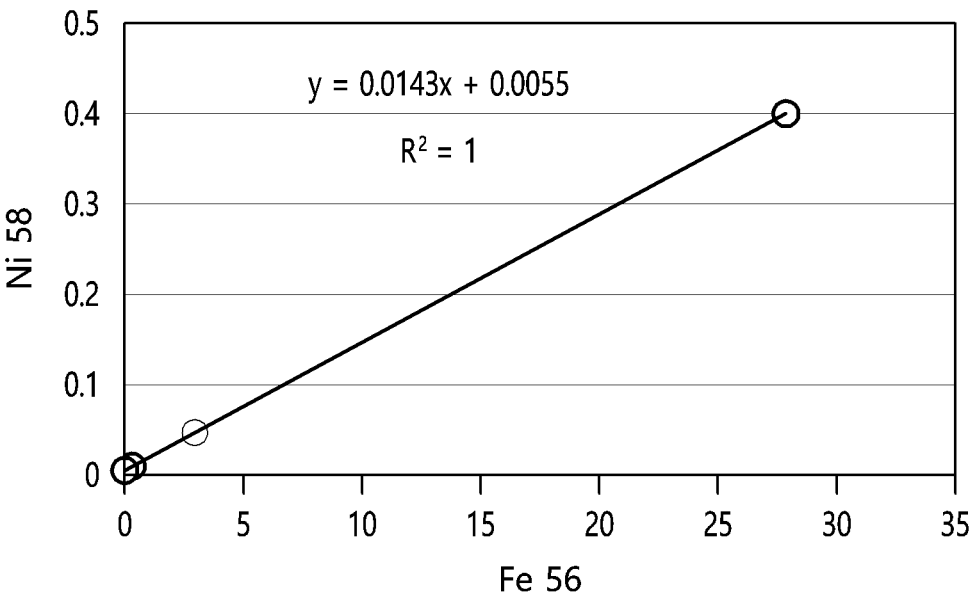
FIG. 6 is a graph showing the correlation between the contamination level of Fe 56 and the contamination level of Ni 58 shown in FIGS. 4a to 4d.

FIG. 6 is a graph showing the correlation between the contamination level of Fe 56 and the contamination level of Ni 58 shown in FIGS. 4a to 4d.

From the graph with the linear relationship shown in FIG. 6, the correction value can be expressed as Equation 1 below.

$$y = 0.0143x + 0.0055 \qquad \text{[Equation 1]}$$

Here, x can represent the contamination level of the second metal, that is, Fe 56, and y can represent the correction value.

The correction value y can be the interference value that Fe 56 gives to Ni 58. That is, the correction value y can be an interference value for the contamination level of Ni 58 that is distorted by Fe 56 and needs to be corrected. Therefore, as will be explained later, by reflecting the corresponding correction value to the contamination level of Ni 58 actually obtained from the wafer, the final contamination level of Ni 58 can be obtained.

Figure 5:
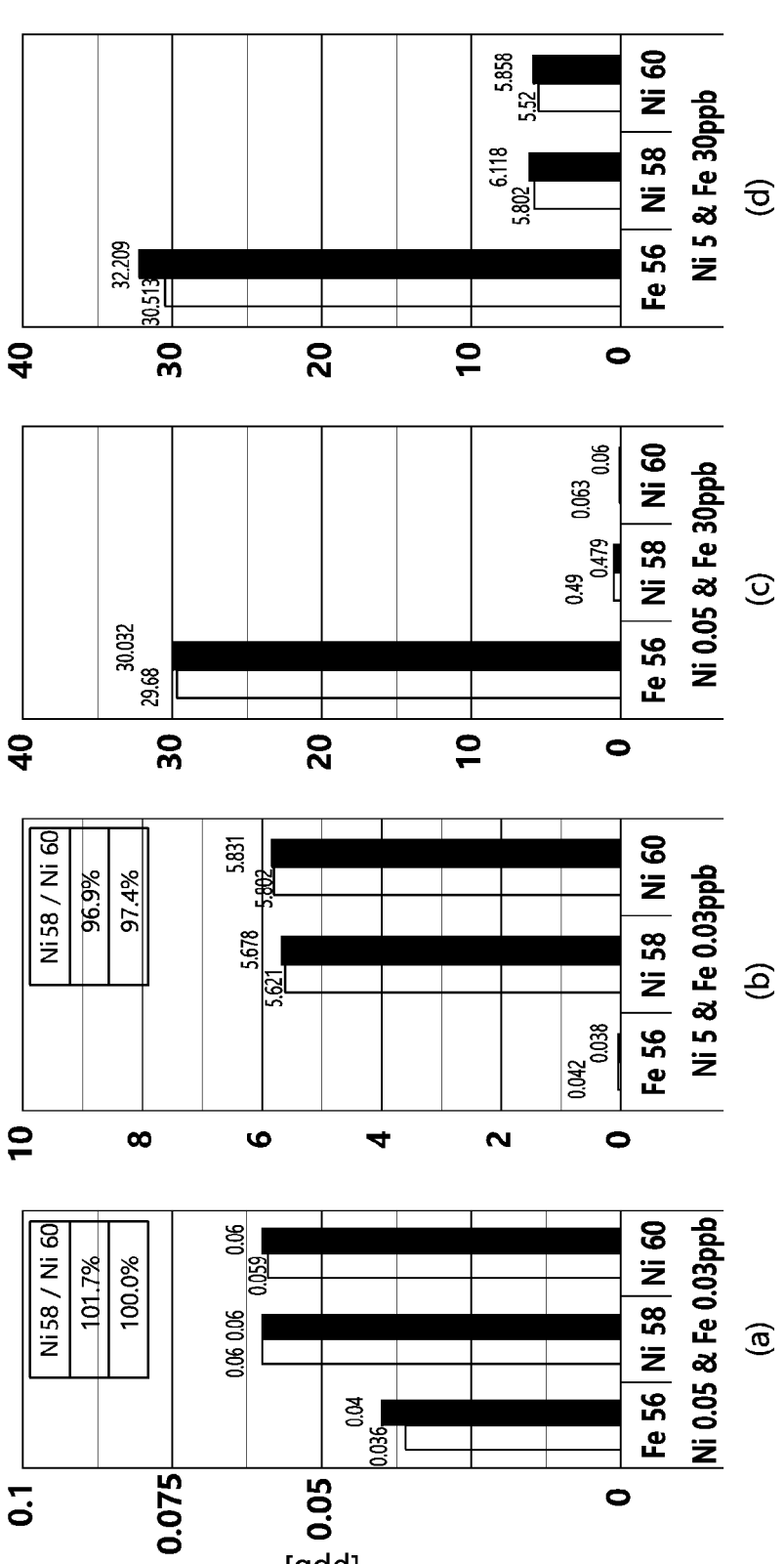
FIG. 5 shows the contamination levels of Fe 56, Ni 58 and Ni 60 verified using a mixed solution containing Ni and Fe.

FIG. 5 shows the contamination levels of Fe 56, Ni 58 and Ni 60 verified using a mixed solution containing Ni and Fe. FIGS. 5(a) to 5(d) show that verification is performed twice.

When verified using a mixed solution containing Ni and Fe, as a result of verification, when the target contamination level of Fe 56 is 0.03 ppb (FIG. 5a and FIG. 5b), Ni 58 is hardly affected by interference by Fe 56. Thus, it can be seen that the contamination level of Ni 58 (0.06 and 0.06) and Ni 60 contamination levels (0.059 and 0.06) can be almost identical, and the contamination level of Ni 58 (0.06 and 0.06) can be almost identical to the target contamination level of Ni 58.

However, as a verification result, when the target contamination level of Fe 56 is as high as 30 ppb (FIG. 5c and FIG. 5d), Ni 58 can be greatly affected by interference by Fe 56. Thus, it can be seen that the contamination level of Ni 58 (0.49 and 0.479) can be very large compared to the contamination level of Ni 60 (0.063 and 0.06), and the contamination level of Ni 58 (0.49 and 0.479) can be much greater than the target contamination level of Ni 58.

Accordingly, as the contamination level of Fe 56 increases, Ni 56 can be greatly affected by interference by Fe 56, and the contamination level of Ni 56 can become abnormally very high. This abnormally high contamination level of Ni 56 needs to be corrected to a contamination level similar to that of Ni 60 as a normal and accurate contamination level. For this correction, the correction value y expressed in Equation 1 can be reflected in the abnormal contamination level of Ni 56 such that the final contamination level of Ni 58, which is normal and similar to Ni 60, can be obtained.

Referring to FIG. 2 and Table 2, a method for obtaining the final metal contamination level of the first metal is described.

Table 2 can be expressed as follows.

TABLE 2

| Sample | Target contamination level[ppb] | | Measured contamination level[ppb] | | | Correction value(C) | Final contamination level of Ni |
|---|---|---|---|---|---|---|---|
| | Ni | Fe | Fe 56 | Ni 58(A) | Ni 60(B) | Ni 58 | 58[ppb](A-C) |
| No. 1 | 0.05 | 30 | 29.680 | 0.490 | 0.063 | 0.430 | 0.060 |
| No. 2 | 0.05 | 30 | 30.032 | 0.479 | 0.060 | 0.435 | 0.044 |

TABLE 2-continued

| | Target contamination level[ppb] | | Measured contamination level[ppb] | | | Correction value(C) | Final contamination level of Ni |
| Sample | Ni | Fe | Fe 56 | Ni 58(A) | Ni 60(B) | Ni 58 | 58[ppb](A-C) |
|---|---|---|---|---|---|---|---|
| No. 3 | 5 | 30 | 30.513 | 5.802 | 5.520 | 0.442 | 5.360 |
| No. 4 | 5 | 30 | 32.209 | 6.118 | 5.858 | 0.466 | 5.652 |

First, as shown in FIG. 2, the contamination level of the first metal, that is, Ni, and the contamination level of the second metal, that is, Fe, can be respectively obtained for the wafer (S120). In Table 2, each sample No. 1 to No. 4 can refer to different wafers.

As shown in Table 2, looking at the measured contamination levels obtained for S120, in Fe 56 and Ni 60, the measured contamination level can be almost similar to the target contamination level, but in Ni 58, the measured contamination level (A) can be very high compared to the target contamination level. In particular, when the target contamination level of Ni is low, that is, when Ni is required to be in trace amounts, if the target contamination level of Ni is 0.05 ppb, it can be seen that the measured contamination level (A) at Ni 58 can be 0.490 ppb (Sample 1 No. 1) and 0.479 ppb (Sample 2 No. 2), which is very high compared to the target contamination level (0.05 ppb).

In these cases, the contamination level (A) of Ni 58 needs to be corrected. Accordingly, in the embodiment, the correction value can be obtained using the correlation equation expressed in Equation 1. That is, the contamination level of the first metal (Ni 58) can be substituted into the correlation equation to obtain a correction value (C) (S130). As shown in Table 2, the correction values (C) of Ni 58 in Sample 1 No. 1 to Sample 4 No. 4, respectively, can be 0.430 ppb, 0.435 ppb, 0.442 ppb and 0466 ppb.

Thereafter, the correction value (C) can be reflected in the contamination level (A) of the first metal (Ni 58) to obtain the final contamination level of the first metal (Ni 58) (S140).

For example, by subtracting the correction value (C) from the contamination level (A) of the first metal (Ni 58), the final contamination level (A-C) of the first metal (Ni 58) can be obtained.

Since the final contamination level (A-C) is very similar to the target contamination level, the contamination level of Ni 58 distorted by Fe 56 can be corrected, and the accuracy of the contamination level of Ni 58 can be dramatically improved, thereby significantly improving reliability.

As shown in Table 2, it can be seen that the final contamination levels (A-C) of Ni 58 in Samples 1 No. 1 to Sample 4 No. 4, respectively can be 0.060 ppb, 0,044 ppb, 5.360 ppb and 5.652 ppb, which are very similar to the contamination levels of Ni 60. The contamination levels of Ni 60 can be 0.063 ppb, 0.060 ppb, 5.520 ppb, and 5.858 ppb, respectively.

Meanwhile, as shown in Tables 2 and 3, it can be seen that the contamination level (A) in Ni 58 actually obtained from the wafer can be due to distortion in Fe 56 and Ni 60, respectively. That is, it can be seen that as shown in Table 2, the distorted value of Ni 58 by Fe 56, that is, the interference value, can be the correction value (C), and in Table 3, the distorted value of Ni 58 by Ni 60 can be the contamination level of Ni 60, which is a converted value (D). The sum of the correction value (C) and the converted value (D) can be the contamination level (A) in Ni 58 actually obtained on the wafer. In other words, the sum of the correction value (C) and the converted value (D) can be very similar to the contamination level (A) in Ni 58 actually obtained on the wafer, which means that the actually obtained contamination level (A) in Ni 58 can be the sum of the distortion caused by Fe 56 and the distortion caused by Ni 60.

TABLE 3

| Sample | Value converted to a contamination level of Ni 60 [ppb](D = B * 0.99) Ni 58 | A + D[ppb] Ni 58(% against A) |
|---|---|---|
| No. 1 | 0.062 | 0.492(100.5%) |
| No. 2 | 0.059 | 0.494(103.2%) |
| No. 3 | 5.465 | 5.907(101.8%) |
| No. 4 | 5.799 | 6.266(102.4%) |

In summary, as shown in FIG. 1, contamination levels of a plurality of metals can be obtained through various analysis methods performed for each location of the wafer. Among the contamination levels of plurality of metals, metals with similar masses (or isotopes) can interfere with each other such that the contamination level of the metal to be analyzed can be distorted. According to an embodiment, as shown in FIGS. 2 to 6, even if the contamination level of the first metal, such as Ni 58, obtained in the wafer is incorrectly obtained by the second metal, such as Fe 56, a correction value can be obtained using a correlation equation that considers the degree of distortion between Ni 58 and Fe 56, and the contamination correction of Ni 58 can be corrected using the correction value to obtain an accurate contamination level. Accordingly, the level of contamination of the metal to be analyzed can become dramatically more accurate, and reliability can be significantly improved.

The above detailed description should not be construed as limiting in all respects and should be considered illustrative. The scope of the embodiment should be determined by reasonable interpretation of the appended claims, and all changes within the equivalent range of the embodiment are included in the scope of the embodiment.

What is claimed is:

1. A method for analyzing metal contamination of a wafer, comprising:

obtaining a contamination level of a first metal and a contamination level of a second metal for the wafer;

obtaining a correction value by substituting the obtained contamination level of the second metal into a correlation equation; and obtaining a final contamination level of the first metal, by correcting the contamination level of the obtained first metal based on the correction value.

2. The method of claim 1, wherein the correlation equation is expressed in Equation 1 below, $$y = 0.0143x + 0.0055 \qquad \text{[Equation 1]}$$

x represents the obtained contamination level of the second metal, and y represents the correction value.

3. The method of claim 1, comprising:

before obtaining the contamination level of the first metal and the contamination level of the second metal, respectively, obtaining the correlation equation.

4. The method of claim 3, wherein the obtaining of the correlation equation comprises:

obtaining the correlation equation based on an interference relationship between the contamination level of the first metal and the contamination level of the second metal in each of the plurality of samples, by verifying a plurality of samples prepared using a mixed solution containing the first metal and the second metal.

5. The method of claim 1, wherein the second metal has an isotope similar to the isotope of the first metal.

6. The method of claim 5, wherein the first metal is $^{58}$Ni, and the second metal is $^{56}$Fe.

7. The method of claim 1, wherein the correction value is an interference value given by the second metal to the first metal.

8. The method of claim 1, wherein the obtaining of the final contamination level of the first metal comprises:

subtracting the correction value from the obtained contamination level of the first metal.

9. An apparatus for analyzing metal contamination of a wafer, comprising:

a controller, wherein the controller is configured to:

obtain a contamination level of a first metal and a contamination level of a second metal for the wafer;

obtain a correction value by substituting the obtained contamination level of the second metal into a correlation equation; and obtain a final contamination level of the first metal, by correcting the contamination level of the obtained first metal based on the correction value.

10. The apparatus of claim 9, wherein the correlation equation is expressed in Equation 1 below, $$y = 0.0143x + 0.0055 \qquad \text{[Equation 1]}$$

x represents the obtained contamination level of the second metal, and y represents the correction value.

11. The apparatus of claim 9, wherein the controller is configured to obtain the correlation equation based on an interference relationship between the contamination level of the first metal and the contamination level of the second metal in each of the plurality of samples, by verifying a plurality of samples prepared using a mixed solution containing the first metal and the second metal.

12. The apparatus of claim 9, wherein the second metal has an isotope similar to the isotope of the first metal.

13. The apparatus of claim 12, wherein the first metal is $^{58}$Ni, and the second metal is $^{56}$Fe.

14. The apparatus of claim 9, wherein the correction value is an interference value given by the second metal to the first metal.

15. The apparatus of claim 9, wherein the controller is configured to subtract the correction value from the obtained contamination level of the first metal.

16. The apparatus of claim 9, wherein the wafer comprises one of a silicon wafer, a silicon carbide wafer, an SOI wafer, a sapphire wafer, and a compound semiconductor wafer.

\* \* \* \* \*